US008106353B2

(12) United States Patent
Loboda

(10) Patent No.: US 8,106,353 B2
(45) Date of Patent: Jan. 31, 2012

(54) APPARATUS AND METHOD OF PHOTO FRAGMENTATION

(75) Inventor: Alexandre Loboda, Thornhill (CA)

(73) Assignee: DH Technologies Pte. Ltd., Singapore (SG)

( * ) Notice: Subject to any disclaimer, the term of this patent is extended or adjusted under 35 U.S.C. 154(b) by 167 days.

(21) Appl. No.: 12/704,672

(22) Filed: Feb. 12, 2010

(65) Prior Publication Data

US 2010/0207023 A1 Aug. 19, 2010

Related U.S. Application Data

(60) Provisional application No. 61/152,376, filed on Feb. 13, 2009.

(51) Int. Cl.
*H01J 49/10* (2006.01)
*H01J 49/26* (2006.01)
*B01D 59/44* (2006.01)

(52) U.S. Cl. ........ 250/288; 250/281; 250/282; 250/287; 250/423 R; 250/424; 315/111.81

(58) Field of Classification Search .................. 250/281, 250/282, 288, 287, 423 R, 424; 315/111.81
See application file for complete search history.

(56) References Cited

U.S. PATENT DOCUMENTS

| | | | | |
|---|---|---|---|---|
| 4,032,786 A | 6/1977 | Young | | |
| 4,140,905 A | 2/1979 | Polanyi | | |
| 5,364,795 A | 11/1994 | Sausa et al. | | |
| 5,826,214 A | 10/1998 | Lieb et al. | | |
| 6,323,482 B1 * | 11/2001 | Clemmer et al. | ............. | 250/287 |
| 6,498,342 B1 * | 12/2002 | Clemmer | ...................... | 250/287 |
| 7,547,878 B2 * | 6/2009 | Schultz et al. | ................ | 250/282 |
| 2009/0309015 A1 * | 12/2009 | Schultz et al. | ................ | 250/281 |

OTHER PUBLICATIONS

International Search Report and Written Opinion issued in connection with corresponding application No. PCT/CA2010/000198, mailed on Apr. 27, 2010.

* cited by examiner

*Primary Examiner* — Nikita Wells

(57) ABSTRACT

A method of photo-fragmentation is provided generating a beam of ions from a sample with an ion source, filtering the beam of ions in a filtering region to select desired ions, and photo-fragmenting the desired ions in a photo-fragmentation region having a higher pressure than the filtering region to generate fragment ions predominantly by prompt fragmentation. An apparatus for photo-fragmentation is provided having an ion source configured to generate a beam of ions from a sample, a filtering region for selecting desired ions, a photo-fragmentation region having a higher pressure than the filtering region to generate predominantly prompt fragmentation of the selected desired ions, an inlet for providing gas to the photo-fragmentation region to maintain a pressure in the photo-fragmentation region that is higher than the pressure in the filtering region, and a photon source emitting a beam of light for photo-fragmenting the selected ions in the photo-fragmentation region.

32 Claims, 14 Drawing Sheets

Note: TIC is Total Ion Current

APPARATUS AND METHOD OF PHOTO FRAGMENTATION

This is a non-provisional application of U.S. Application No. 61/152,376 filed Feb. 13, 2009. The contents of U.S. Application No. 61/152,376 are incorporated herein by reference.

FIELD

The applicant's teachings relate to an apparatus and method of photo-fragmentation in a mass spectrometer.

INTRODUCTION

Photo-fragmentation is an ion fragmentation technique in which ions can be fragmented via excitation with photons. Photons with high energy, such as those in the ultra-violet (UV) or visible (vis) range can excite electronic states such that even one photon is often sufficient to break a chemical bond. Bonds can be broken very rapidly, on the femto-second to nano-second time scale, by prompt fragmentation or they can be broken slower, on the micro-second to milli-second time scale, by metastable fragmentation. Since metastable fragmentation patterns are readily observed with low energy collision induced dissociation (CID), the most widely used method of ion fragmentation, these fragmentation patterns can be unwanted since they superimpose with unique patterns generated by prompt fragmentation and therefore complicate the overall spectra. Also, since fragmentation pathways available through low energy CID are not sufficient to decipher ion composition or avoid problems with ion interference, other fragmentation methods that provide distinctly different fragmentation patterns are needed.

SUMMARY

In accordance with an aspect of the applicant's teachings, there is provided a method of photo-fragmentation. The method comprises generating a beam of ions from a sample with an ion source, filtering the beam of ions in a filtering region to select desired ions, and photo-fragmenting the selected desired ions in a photo-fragmentation region having a higher pressure than the filtering region to generate fragment ions predominantly by prompt fragmentation.

The method can further comprise trapping the selected ions in the photo-fragmentation region after filtering the beam of ions in a filtering region. The trapping can comprise providing an RF ion guide for confining the ions. The method can further comprise filtering the fragment ions in the filtering region to select desired fragment ions after photo-fragmenting the selected desired ions in a photo-fragmentation region with a higher pressure than the filtering region. Furthermore, the selected fragment ions can be photo-fragmented in the photo-fragmentation region that is at a higher pressure than the filtering region to generate secondary fragment ions predominantly by prompt fragmentation. Also, the fragment and secondary fragment ions can be further fragmented by fragmentation techniques, such as, for example, collision induced dissociation, surface induced dissociation, fragmentation by metastable atom bombardment, electron capture dissociation, electron transfer dissociation, or photo-fragmentation. The fragment and secondary fragment ions can be mass analyzed. Furthermore, the filtering, photo-fragmenting, trapping, and mass analyzing of the ions, fragment ions, and secondary fragment ions can occur in the same region.

Gas, which can be pulsed, can be provided for maintaining the higher pressure in the photo-fragmentation region than the filtering region. The pressure in the photo-fragmentation region can be greater than 1 mTorr and can be from about 10 mTorr to about 100 Torr. In various embodiments, the pressure in the photo-fragmentation region can be from about 10 mTorr to about 10 Torr. In various aspects, the gas can be controlled by a flow control device. For example, the flow control device can be a pulsed or a proportional valve. The pressure in the region can also be adjusted by opening/closing pumping port, or by other suitable means as known in the art. A photon source, such as for example, a laser, LED, discharge lamp, or a source of light with adjustable properties, can photo-fragment the selected ions. The wavelength of the photon source can be capable of causing photo-fragmentation of the selected ions. The photon source can emit a beam of light at a wavelength from about 190 nm to about 900 nm. The beam of light from the photon source can be reflected multiple times with mirrors to increase the efficiency of the photo-fragmentation of the selected ions. The beam of light emitted by the photon source and the beam of ions generated by the ion source can be co-aligned with each other or can intersect each other.

In another aspect, an apparatus for photo-fragmentation can be provided comprising an ion source configured to generate a beam of ions from a sample, a filtering region for selecting desired ions, a photo-fragmentation region having a higher pressure than the filtering region to generate predominantly prompt fragmentation of the selected desired ions, an inlet for providing gas to the photo-fragmentation region to maintain a pressure in the photo-fragmentation region that is higher than the pressure in the filtering region, and a photon source emitting a beam of light for photo-fragmenting the selected ions in the photo-fragmentation region.

The apparatus can further comprise a trapping region in the photo-fragmentation region for trapping the selected desired ions. The trapping can comprise providing an RF ion guide for confining the ions. Furthermore, the apparatus can comprise a mass analyzer for mass analyzing the fragment ions. The filtering region, photo-fragmentation region, trapping region, and mass analyzer can be located in the same region. The pressure in the photo-fragmentation region can be greater than 1 mTorr and can be from about 10 mTorr to about 100 Torr. In various embodiments, the pressure in the photo-fragmentation region can be from about 10 mTorr to about 10 Torr. The gas, which can be pulsed, can be controlled by a flow control device. For example, the flow control device can be a pulsed or a proportional valve. The pressure in the region can also be adjusted by opening/closing pumping port, or by other suitable means as known in the art. A photon source can be, for example, a laser, LED, discharge lamp, or a source of light with adjustable properties. The wavelength of the photon source can be capable of causing photo-fragmentation of the selected ions. The photon source can emit a beam of light at a wavelength from about 190 nm to about 900 nm. The beam of light from the photon source can be reflected multiple times with mirrors to increase the efficiency of the photo-fragmentation of the selected ions. The beam of light emitted by the photon source and the beam of ions generated by the ion source can be co-aligned with each other or can intersect each other.

These and other features of the applicants' teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION OF VARIOUS EMBODIMENTS

Figure 1:
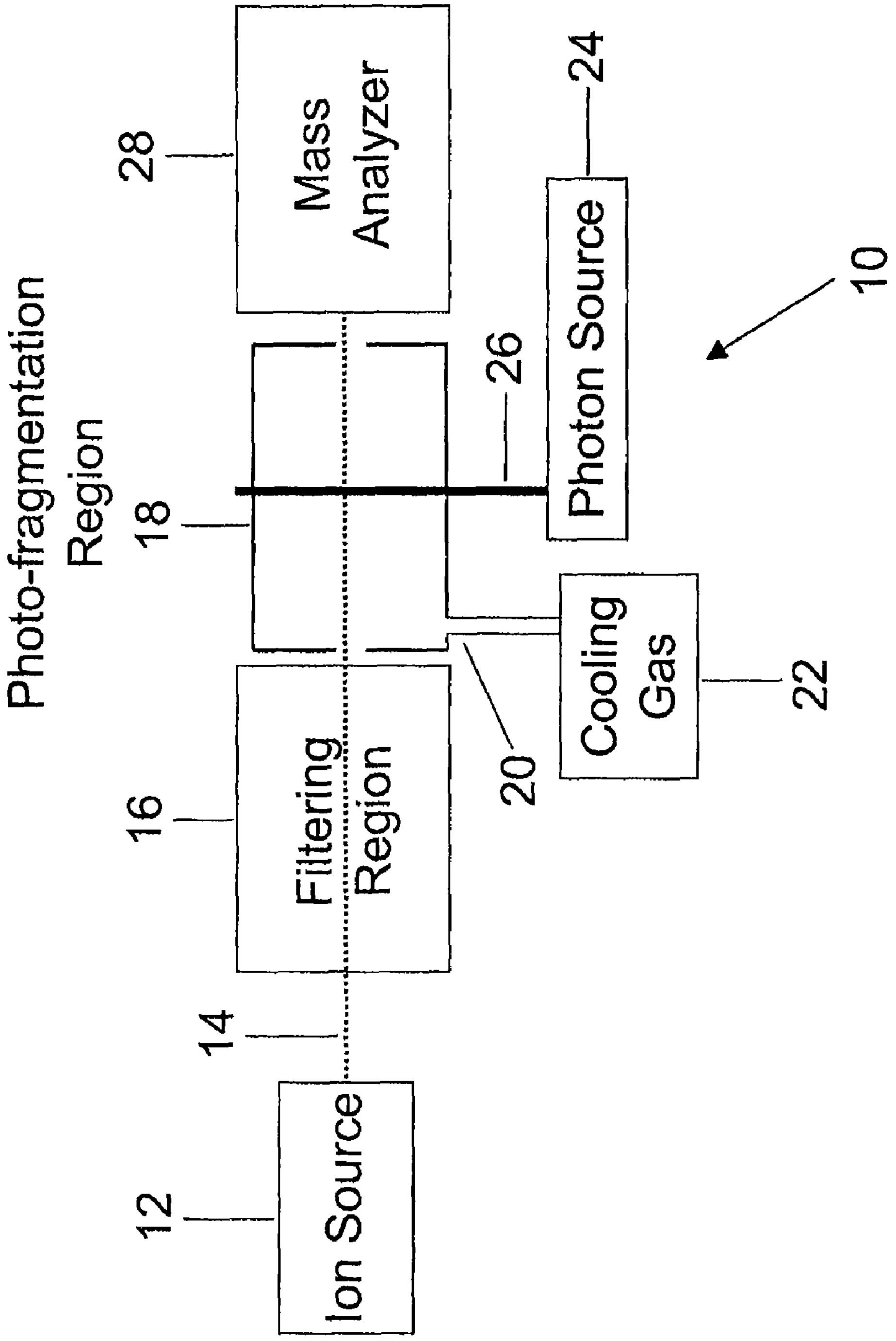
FIG. 1 schematically illustrates a photo-fragmentation system in accordance with various embodiments of the applicant's teachings.

It should be understood that the phrase "a" or "an" used in conjunction with the applicant's teachings with reference to various elements encompasses "one or more" or "at least one" unless the context clearly indicates otherwise. Referring to FIG. 1, in various embodiments in accordance with the applicant's teachings, a schematic diagram illustrates a photo-fragmentation system 10 having an ion source 12 configured to generate a beam of ions 14 from a sample into a filtering region 16 for selecting desired ions. A photo-fragmentation region 18 having a higher pressure than the filtering region 16 can be provided to generate fragment ions predominantly by prompt fragmentation. In various embodiments, the pressure in the photo-fragmentation region 18 can be greater than 1 mTorr. In various embodiments, the pressure in the photo-fragmentation region 18 can be from about 10 mTorr to about 100 Torr. An inlet 20 can provide gas 22, referred to as cooling gas, to the photo-fragmentation region 18 to maintain the higher pressure in the photo-fragmentation region 18 than the pressure in the filtering region 16. In various embodiments, the gas 22 can be pulsed. In various aspects, the gas 22 can be controlled by a flow control device. For example, the flow control device can be a pulsed valve or a proportional valve. The pressure in the region 18 can also be adjusted by opening/closing a pumping port, or by other suitable means as known in the art. A photon source 24 can emit a beam of light 26 for photo-fragmenting the selected desired ions in the photo-fragmentation region 18 to generate fragment ions predominantly by prompt fragmentation. The photon source 24 can comprise, for example, a laser or an array of lasers, LED or array of LEDs, discharge lamp, a source of light with adjustable properties or any other source as known in the art. The photon source 24 can be capable of causing photo-fragmentation of the selected ions. In various embodiments, the photon source 24 can emit a beam of light 26 at a wavelength from about 190 nm to about 900 nm. The beam of light 26 emitted by the photon source can be reflected multiple times with mirrors to increase the efficiency of photo-fragmentation of the selected ions. In various embodiments, the beam of light 26 emitted by the photon source 24 and the beam of ions 14 generated by the ion source 12 can intersect each other, as shown in FIG. 1. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 28 can mass analyze the fragment ions. The mass analyzer 28 can comprise a more complex instrument that can provide sophisticated ion analysis such as mass analysis, ion mobility separation, additional fragmentation or a combination of the above.

Figure 2:
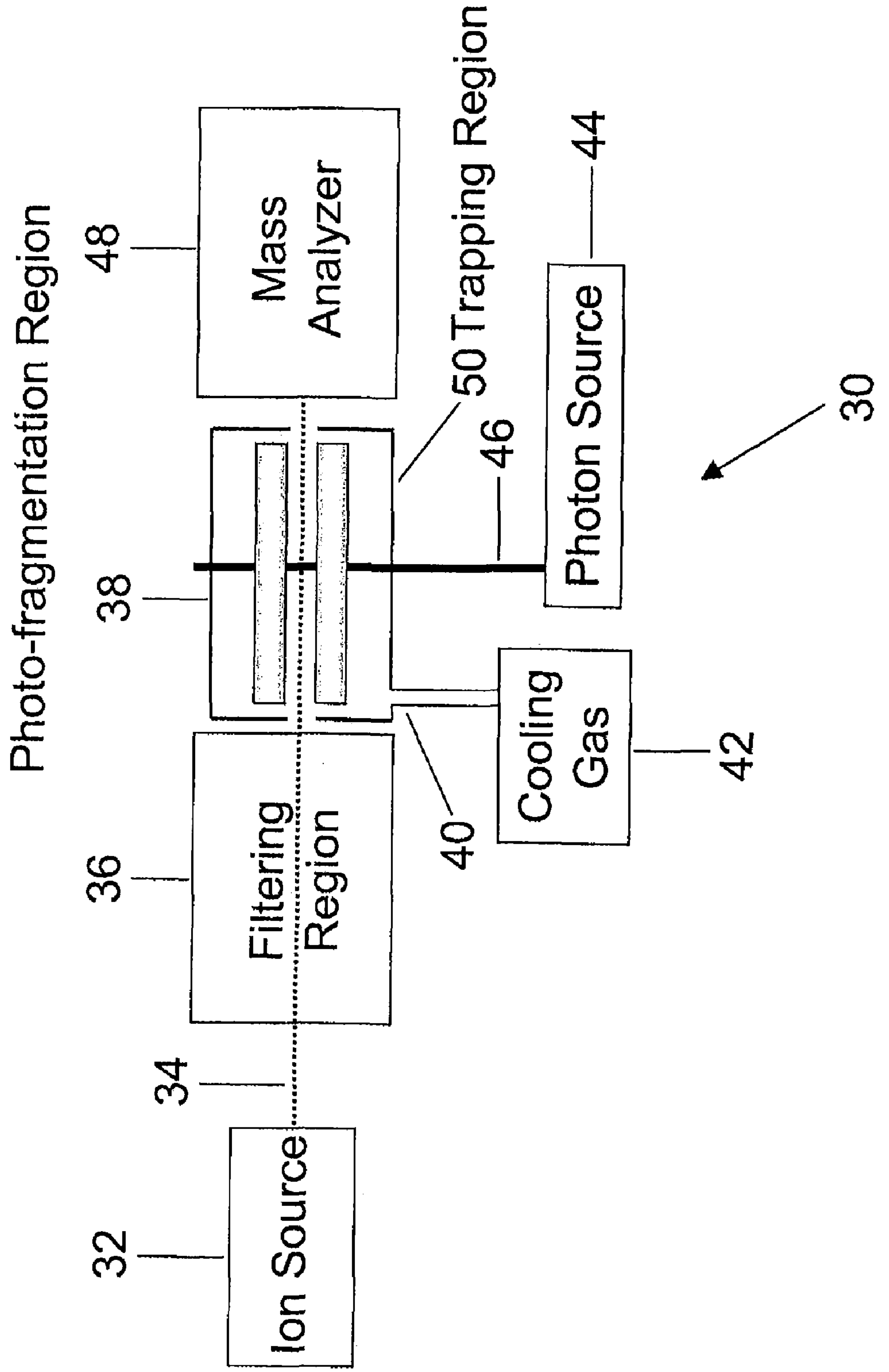
FIG. 2 schematically illustrates a photo-fragmentation system, including a linear ion trap, in accordance with various embodiments.

As shown in FIG. 2, in various embodiments in accordance with the applicant's teachings, a schematic diagram illustrates a photo-fragmentation system 30 having an ion source 32 configured to generate a beam of ions 34 from a sample into a filtering region 36 for selecting desired ions. A photo-fragmentation region 38 having a higher pressure than the filtering region 36 can be provided to generate fragment ions predominantly by prompt fragmentation. A trapping region 50 can be provided in the photo-fragmentation region 38. The selected desired ions from the filtering region 36 can be trapped in the trapping region 50. The trapping region 50 can comprise an RF ion guide for confining the ions. In various embodiments, the pressure in the photo-fragmentation region 38 can be greater than 1 mTorr. In various embodiments, the pressure in the photo-fragmentation region 38 can be from about 10 mTorr to about 100 Torr and preferably from about 10 mTorr to about 10 Torr. An inlet 40 can provide gas 42, referred to as cooling gas, to the photo-fragmentation region 38 to maintain the higher pressure in the photo-fragmentation region 38 than the pressure in the filtering region 36. In various embodiments, the gas 42 can be pulsed. In various aspects, the gas 42 can be controlled by a flow control device. For example, the flow control device can be a pulsed or a proportional valve. The pressure in the region 38 can also be adjusted by opening/closing pumping port, or by other suitable means as known in the art. A photon source 44 can emit a beam of light 46 for photo-fragmenting the selected desired ions in the photo-fragmentation region 38 to generate fragment ions predominantly by prompt fragmentation. The photon source 44 can comprise, for example, a laser or an array of lasers, LED or array of LEDs, discharge lamp, a source of light with adjustable properties or any other source as known in the art. The photon source 44 can be capable of causing photo-fragmentation of the selected ions. In various embodiments, the photon source 44 can emit a beam of light 46 at a wavelength from about 190 nm to about 900 nm. The beam of light 46 emitted by the photon source can be reflected multiple times with mirrors to increase the efficiency of photo-fragmentation of the selected ions. In various embodiments, the beam of light 46 emitted by the photon source 44 and the beam of ions 34 generated by the ion source 32 can intersect each other as shown in FIG. 2. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 48 can mass analyze the fragment ions. The mass analyzer 48 can comprise a more complex instrument that can provide sophisticated ion analysis such as mass analysis, ion mobility separation, additional fragmentation or a combination of the above.

Figure 3:
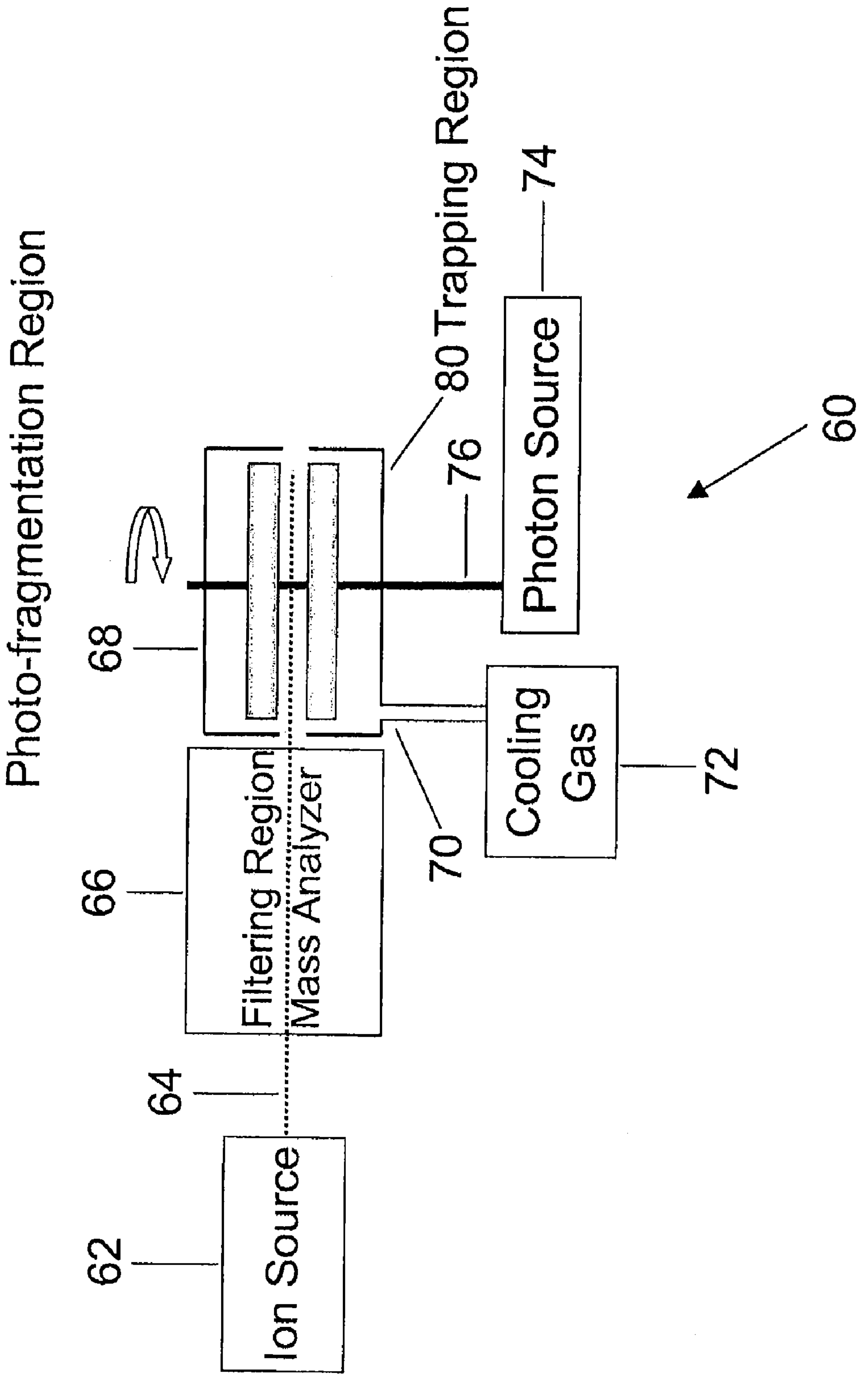
FIG. 3 schematically illustrates a photo-fragmentation system in which the filtering region and the mass analyzer are located in the same region, in accordance with various embodiments.

Referring to FIG. 3, in various embodiments in accordance with the applicant's teachings, a schematic diagram illustrates a photo-fragmentation system 60 having an ion source 62 configured to generate a beam of ions 64 from a sample into a filtering region 66 for selecting desired ions. A photo-fragmentation region 68 having a higher pressure than the filtering region 66 can be provided to generate fragment ions predominantly by prompt fragmentation. A trapping region 80 can be provided in the photo-fragmentation region 68. The selected desired ions from the filtering region 66 can be trapped in the trapping region 80. The trapping region can comprise an RF ion guide for confining the ions. In various embodiments, the pressure in the photo-fragmentation region can be greater than 1 mTorr. In various embodiments, the pressure in the photo-fragmentation region 68 can be from about 10 mTorr to about 100 Torr and preferably from about 10 mTorr to about 10 Torr. An inlet 70 can provide gas 72, referred to as cooling gas, to the photo-fragmentation region 68 to maintain the higher pressure in the photo-fragmentation region 68 than the pressure in the filtering region 66. In various embodiments, the gas 72 can be pulsed. For example, the flow control device can be a pulsed or a proportional valve. The pressure in the region 68 can also be adjusted by opening/closing pumping port, or by other suitable means as known in the art. In various aspects, the gas 72 can be controlled by a flow control device. A photon source 74 can emit a beam of light 76 for photo-fragmenting the selected desired ions in the photo-fragmentation region 68 to generate fragment ions predominantly by prompt fragmentation. The photon source 74 can comprise, for example, a laser or an array of lasers, LED or array of LEDs, discharge lamp, a source of light with adjustable properties or any other source as known in the art. The photon source 74 can be capable of causing photo-fragmentation of the selected ions. In various embodiments, the photon source 74 can emit a beam of light 76 at a wavelength from about 190 nm to about 900 nm. The beam of light 76 emitted by the photon source 74 can be reflected multiple times with mirrors to increase the efficiency of photo-fragmentation of the selected ions. In various embodiments, the beam of light 76 emitted by the photon source 74 and the beam of ions 64 generated by the ion source 62 can intersect each other as shown in FIG. 3. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, the fragment ions can be filtered in the filtering region 66 to select desired fragment ions. In various embodiments, the selected desired fragment ions can be photo-fragmented in the photo-fragmentation region 68 to generate secondary fragment ions predominantly by prompt fragmentation, the photo-fragmentation region 68 having a higher pressure than the filtering region 66. In various embodiments, a mass analyzer 66 can mass analyze the fragment or secondary fragment ions. In various embodiments, the mass analyzer 66 can be located in the same region as the filtering region, as shown in FIG. 3.

Figure 4:
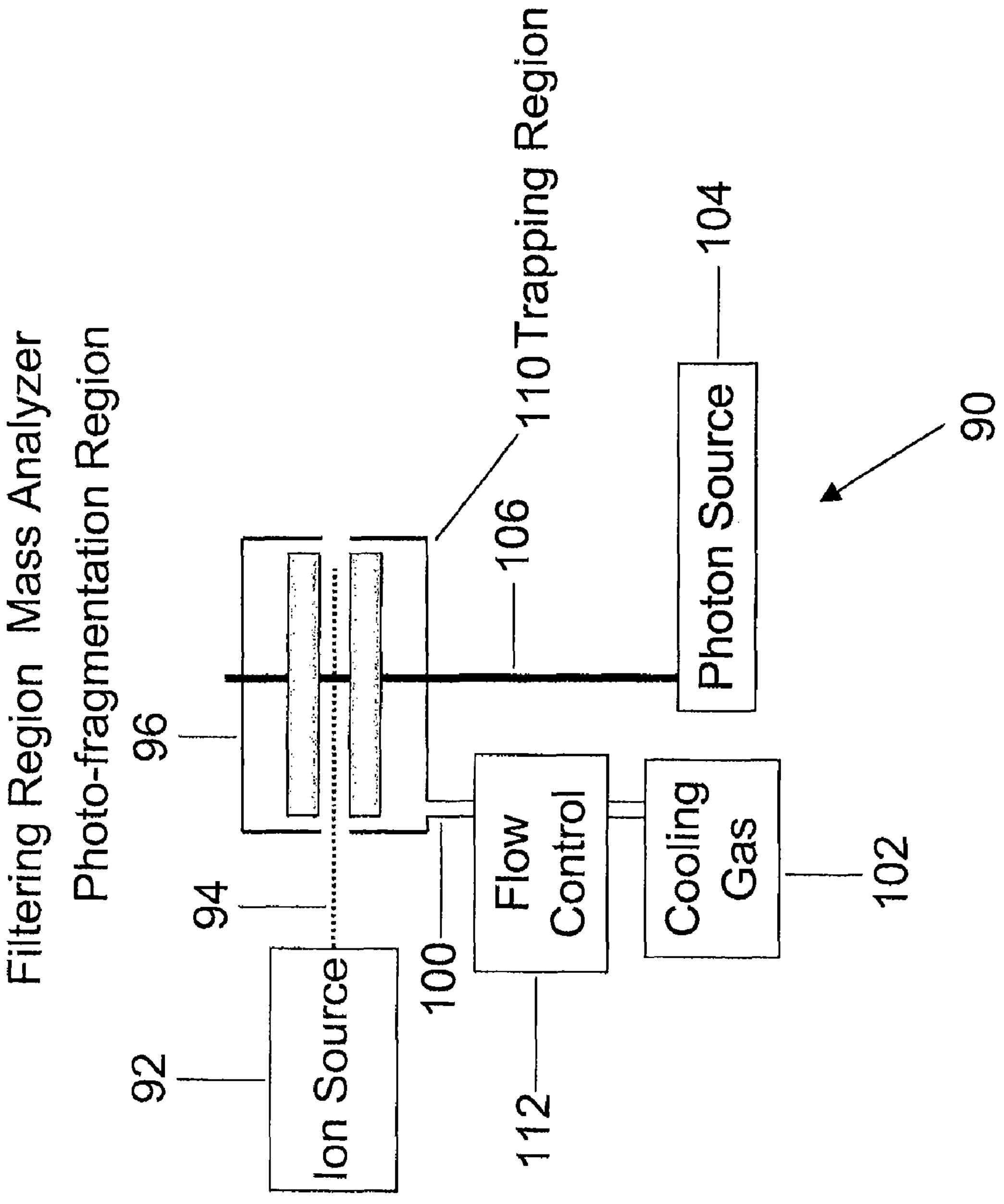
FIG. 4 schematically illustrates a photo-fragmentation system in which the filtering region, photo-fragmentation region, and mass analyzer are located in the same region, in accordance with various embodiments.

Referring to FIG. 4, in various embodiments in accordance with the applicant's teachings, a schematic diagram illustrates a photo-fragmentation system 90 having an ion source 92 configured to generate a beam of ions 94 from a sample into a filtering region 96 for selecting desired ions. A photo-fragmentation region 96, located in the same region as the filtering region 96 as shown in FIG. 4, can be adapted to have a higher pressure when photo-fragmenting the desired ions than when filtering the ions to generate fragment ions predominantly by prompt fragmentation. A trapping region 110 can be provided in the photo-fragmentation region 96. The selected desired ions from the filtering region 96 can be trapped in the trapping region 110. Alternatively, incoming ions can be first trapped in the trapping region 110 and then filtered in the filtering region 96. The trapping region can comprise an RF ion guide for confining the ions. In various embodiments, the pressure in the photo-fragmentation region 96 can be greater than 1 mTorr. In various embodiments, the pressure in the photo-fragmentation region 96 can be from about 10 mTorr to about 100 Torr and preferably from about 10 mTorr to about 10 Torr. An inlet 100 can provide gas 102, referred to as cooling gas, to the photo-fragmentation region 96 to maintain the higher pressure in the photo-fragmentation region 96 than the pressure in the filtering region 96. In various embodiments, the gas 102 can be pulsed. In various aspects, the gas 102 can be controlled by a flow control device 112. For example, the flow control device 112 can be a pulsed or a proportional valve. The pressure in the region 96 can also be adjusted by opening/closing pumping port, or by other suitable means as known in the art. A photon source 104 can emit a beam of light 106 for photo-fragmenting the selected desired ions in the photo-fragmentation region 96 to generate fragment ions predominantly by prompt fragmentation. The photon source 104 can comprise, for example, a laser or an array of lasers, LED or array of LEDs, discharge lamp, a source of light with adjustable properties or any other source as known in the art. The photon source 104 can be capable of causing photo-fragmentation of the selected ions. In various embodiments, the photon source 104 can emit a beam of light at a wavelength from about 190 nm to about 900 nm. The beam of light 106 emitted by the photon source can be reflected multiple times with mirrors to increase the efficiency of photo-fragmentation of the selected ions. In various embodiments, the beam of light 106 emitted by the photon source 104 and the beam of ions 94 generated by the ion source 92 can intersect each other as shown in FIG. 4. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 96 can be located in the same region as the filtering and photo-fragmentation regions 96 as shown in FIG. 4. The mass analyzer 96 can mass analyze the fragment ions. The mass analyzer 96 can comprise a more complex instrument that can provide sophisticated ion analysis such as mass analysis, ion mobility separation, additional fragmentation or a combination of the above.

Figure 5:
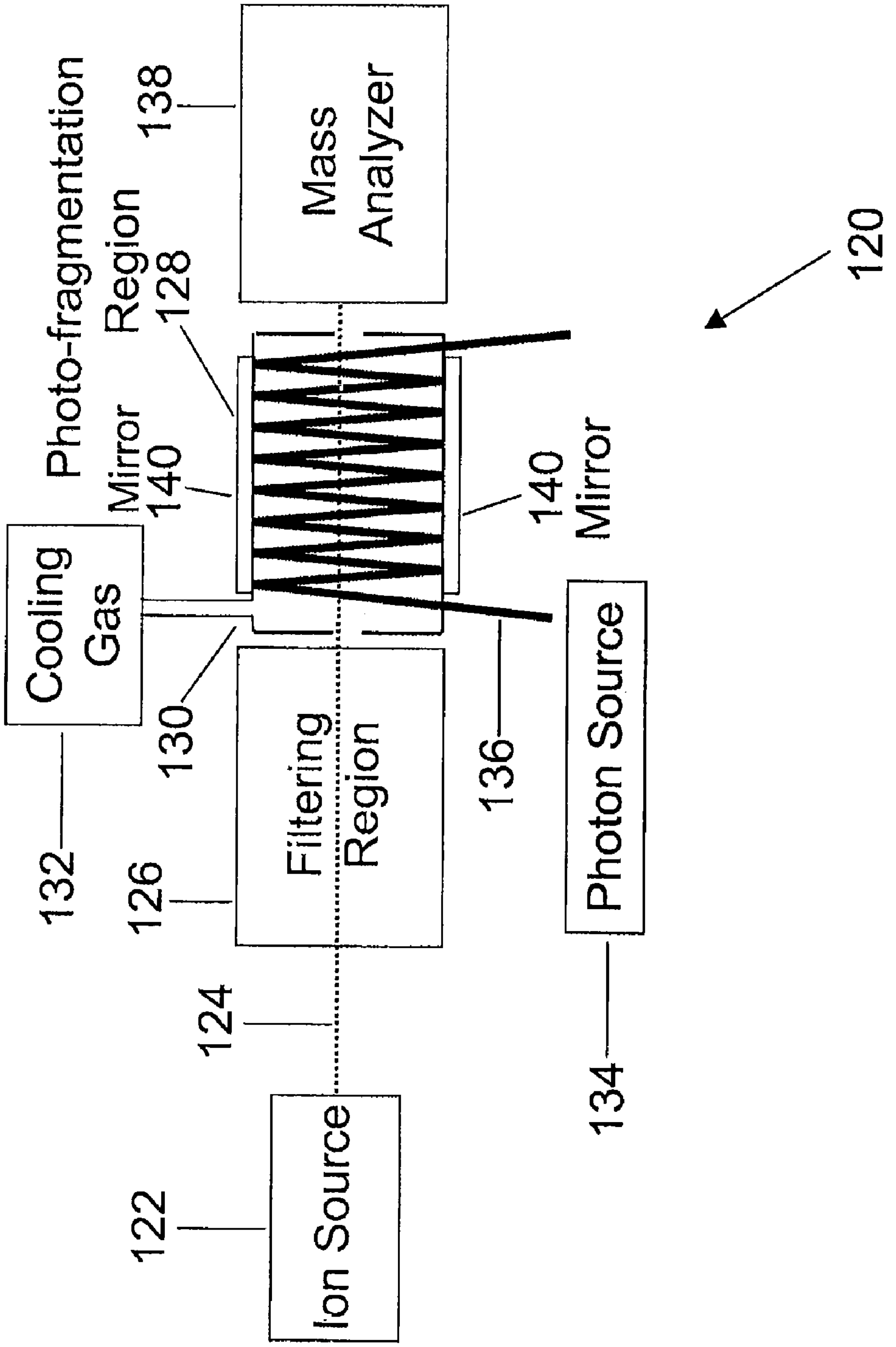
FIG. 5 schematically illustrates a photo-fragmentation system, including mirrors to reflect the beam of light from the photon source multiple times, in accordance with various embodiments.

Referring to FIG. 5, in various embodiments in accordance with the applicant's teachings, a schematic diagram illustrates a photo-fragmentation system 120 having an ion source 122 configured to generate a beam of ions 124 from a sample into a filtering region 126 for selecting desired ions. A photo-fragmentation region 128 having a higher pressure than the filtering region 126 can be provided to generate fragment ions predominantly by prompt fragmentation. In various embodiments, the pressure in the photo-fragmentation region 128 can be greater than 1 mTorr. In various embodiments, the pressure in the photo-fragmentation region 128 can be from about 10 mTorr to about 100 Torr. An inlet 130 can provide gas 132, referred to as cooling gas, to the photo-fragmentation region 128 to maintain the higher pressure in the photo-fragmentation region 128 than the pressure in the filtering region 126. In various embodiments, the gas 132 can be pulsed. In various aspects, the gas 132 can be controlled by a flow control device. For example, the flow control device can be a pulsed or a proportional valve. The pressure in the region 128 can also be adjusted by opening/closing pumping port, or by other suitable means as known in the art. A photon source 134 can emit a beam of light 136 for photo-fragmenting the selected desired ions in the photo-fragmentation region 128 to generate fragment ions predominantly by prompt fragmentation. The photon source 134 can comprise, for example, a laser or an array of lasers, LED or array of LEDs, discharge lamp, a source of light with adjustable properties or any other source as known in the art. The photon source 134 can be capable of causing photo-fragmentation of the selected ions. In various embodiments, the photon source 134 can emit a beam of light 136 at a wavelength from about 190 nm to about 900 nm. As shown in FIG. 5, the beam of light 136 emitted by the photon source 134 can be reflected multiple times with mirrors 140 to increase the efficiency of photo-fragmentation of the selected ions. Such a configuration is known as a multi-pass optical reflection cell. In various embodiments, the beam of light 136 emitted by the photon source 134 and the beam of ions 124 generated by the ion source 122 can intersect each other, as shown in FIG. 5. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 138 can mass analyze the fragment ions. The mass analyzer 138 can comprise a more complex instrument that can provide sophisticated ion analysis such as mass analysis, ion mobility separation, additional fragmentation or a combination of the above.

Figure 6:
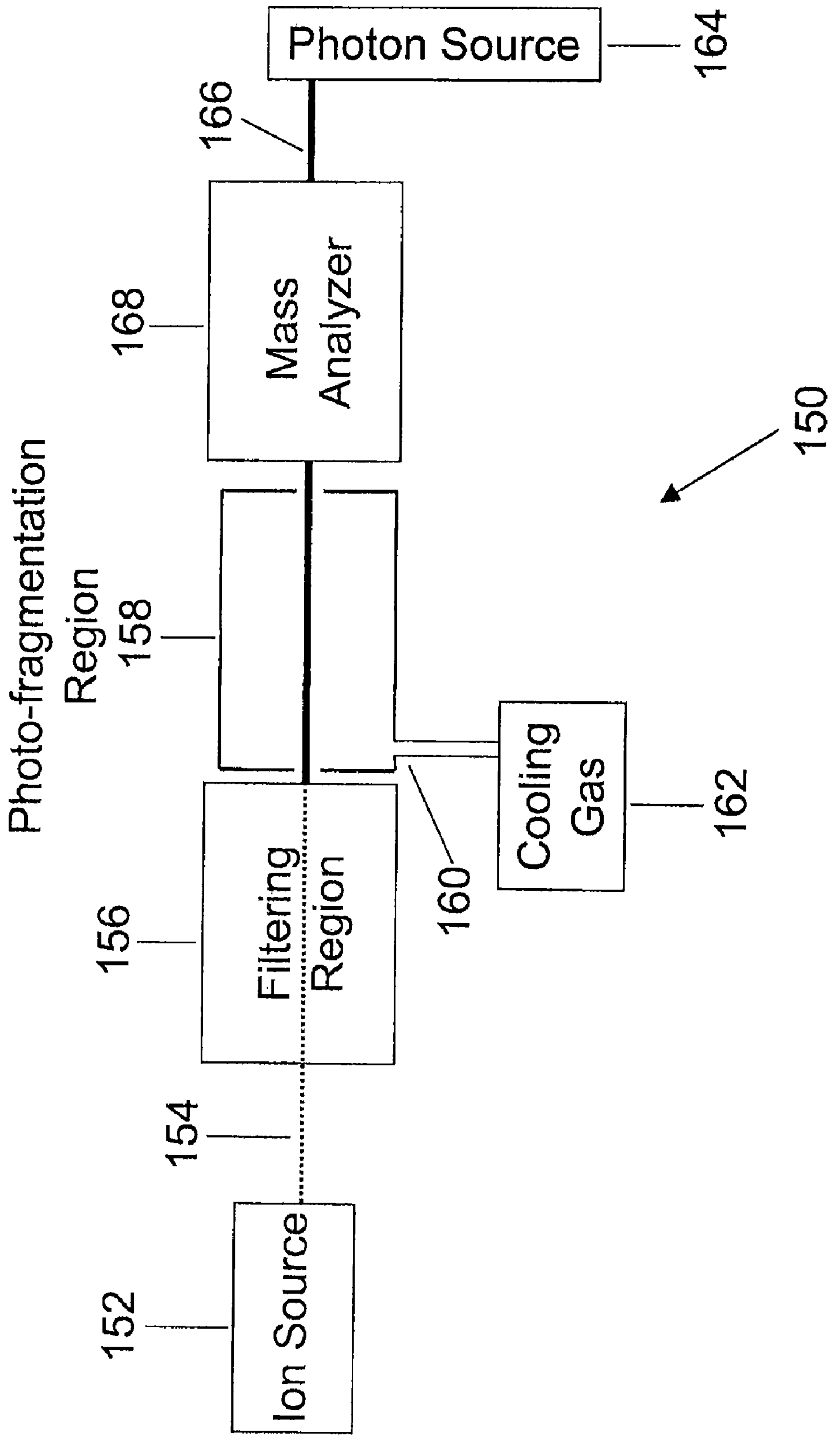
FIG. 6 schematically illustrates a photo-fragmentation system in which the beam of light emitted by the photon source and the beam of ions generated by the ion source are co-aligned with each other, in accordance with various embodiments.

Referring to FIG. 6, in various embodiments in accordance with the applicant's teachings, a schematic diagram illustrates a photo-fragmentation system 150 having an ion source 152 configured to generate a beam of ions 154 from a sample into a filtering region 156 for selecting desired ions. A photo-fragmentation region 158 having a higher pressure than the filtering region 156 can be provided to generate fragment ions predominantly by prompt fragmentation. In various embodiments, the pressure in the photo-fragmentation region 158 can be greater than 1 mTorr. In various embodiments, the pressure in the photo-fragmentation region 158 can be from about 10 mTorr to about 100 Torr. An inlet 160 can provide gas 162, referred to as cooling gas, to the photo-fragmentation region 158 to maintain the higher pressure in the photo-fragmentation region 158 than the pressure in the filtering region 156. In various embodiments, the gas 162 can be pulsed. In various aspects, the gas 162 can be controlled by a flow control device. For example, the flow control device can be a pulsed or a proportional valve. The pressure in the region 158 can also be adjusted by opening/closing pumping port, or by other suitable means as known in the art. A photon source 164 can emit a beam of light 166 for photo-fragmenting the selected desired ions in the photo-fragmentation region 158 to generate fragment ions predominantly by prompt fragmentation. The photon source 164 can comprise, for example, a laser or an array of lasers, LED or array of LEDs, discharge lamp, a source of light with adjustable properties or any other source as known in the art. The photon source 164 can be capable of causing photo-fragmentation of the selected ions. In various embodiments, the photon source 164 can emit a beam of light 166 at a wavelength from about 190 nm to about 900 nm. The beam of light 166 emitted by the photon source 164 can be reflected multiple times with mirrors to increase the efficiency of photo-fragmentation of the selected ions. In various embodiments, the beam of light 166 emitted by the photon source 164 and the beam of ions 154 generated by the ion source 152 can co-align with each other, as shown in FIG. 6. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 168 can mass analyze the fragment ions. The mass analyzer 168 can comprise a more complex instrument that can provide sophisticated ion analysis such as mass analysis, ion mobility separation, additional fragmentation or a combination of the above.

Figure 7:
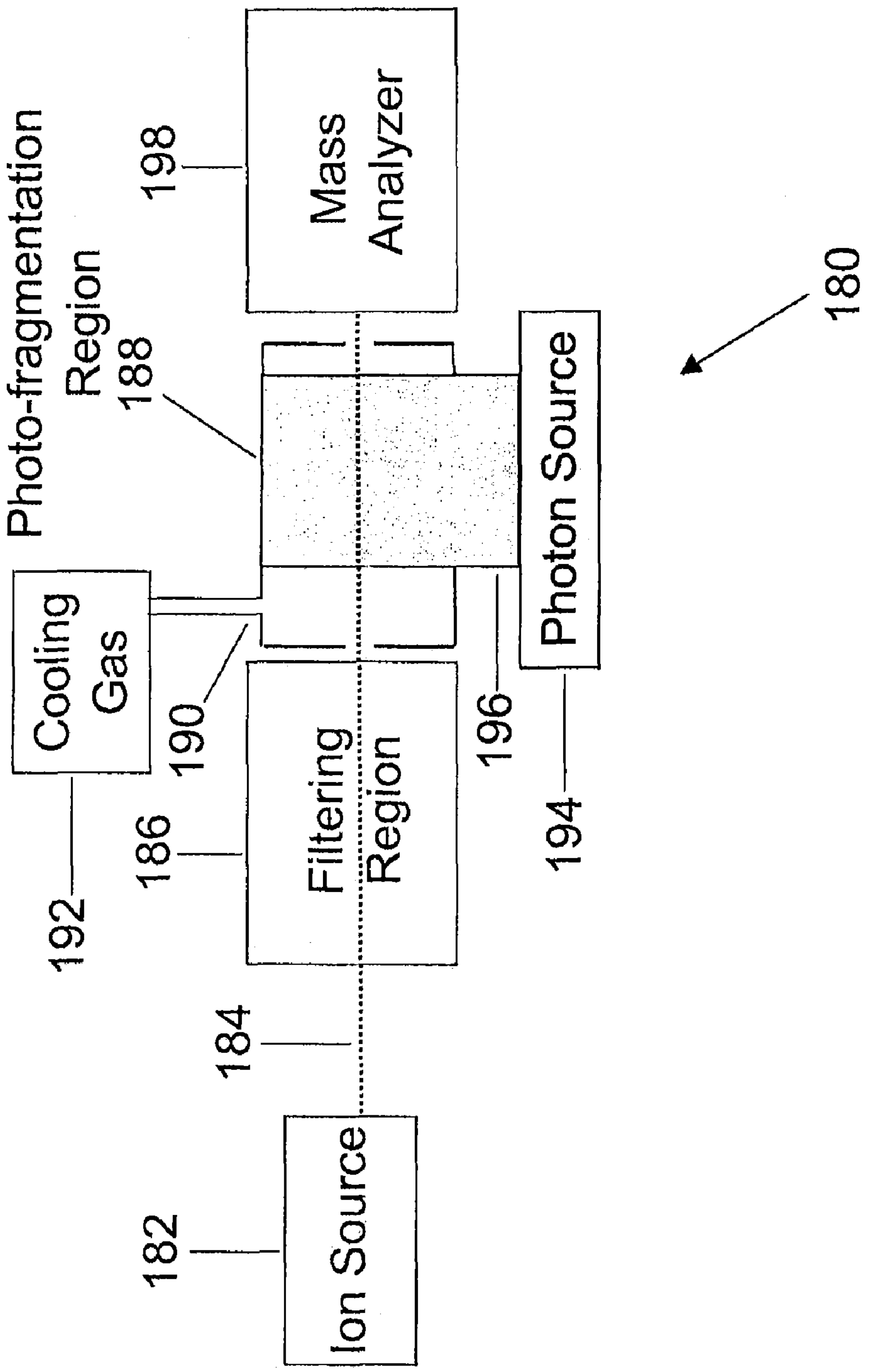
FIG. 7 schematically illustrates a photo-fragmentation system in which the beam of light emitted by the photon source is a broad beam, in accordance with various embodiments.

Referring to FIG. 7, in various embodiments in accordance with the applicant's teachings, a schematic diagram illustrates a photo-fragmentation system 180 having an ion source 182 configured to generate a beam of ions 184 from a sample into a filtering region 186 for selecting desired ions. A photo-fragmentation region 188 having a higher pressure than the filtering region 186 can be provided to generate fragment ions predominantly by prompt fragmentation. In various embodiments, the pressure in the photo-fragmentation region 188 can be greater than 1 mTorr. In various embodiments, the pressure in the photo-fragmentation region 188 can be from about 10 mTorr to about 100 Torr. An inlet 190 can provide gas 192, referred to as cooling gas, to the photo-fragmentation region 188 to maintain the higher pressure in the photo-fragmentation region 188 than the pressure in the filtering region 186. In various embodiments, the gas 192 can be pulsed. In various aspects, the gas 192 can be controlled by a flow control device. For example, the flow control device can be a pulsed or a proportional valve. The pressure in the region 188 can also be adjusted by opening/closing pumping port, or other suitable means as known in the art. A photon source 194 can emit a beam of light 196 for photo-fragmenting the selected desired ions in the photo-fragmentation region 188 to generate fragment ions predominantly by prompt fragmentation. The beam of light 196 can be a broad beam of light as shown in FIG. 7. Such a broad beam of light can be produced, for example, by a laser or an array of lasers, by an LED or an array of LEDs, a discharge lamp, or any other source as known in the art. The photon source 194 can be capable of causing photo-fragmentation of the selected ions. In various embodiments, the photon source 194 can emit a beam of light 196 at a wavelength from about 190 nm to about 900 nm. The beam of light 196 emitted by the photon source can be reflected multiple times with mirrors to increase the efficiency of photo-fragmentation of the selected ions. In various embodiments, the beam of light 196 emitted by the photon source 194 and the beam of ions 184 generated by the ion source 182 can intersect each other, as shown in FIG. 7 where the beam of light 196 is spread along the photo-fragmentation region. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 198 can mass analyze the fragment ions. The mass analyzer 198 can comprise a more complex instrument that can provide sophisticated ion analysis such as mass analysis, ion mobility separation, additional fragmentation or a combination of the above.

Figure 8B:
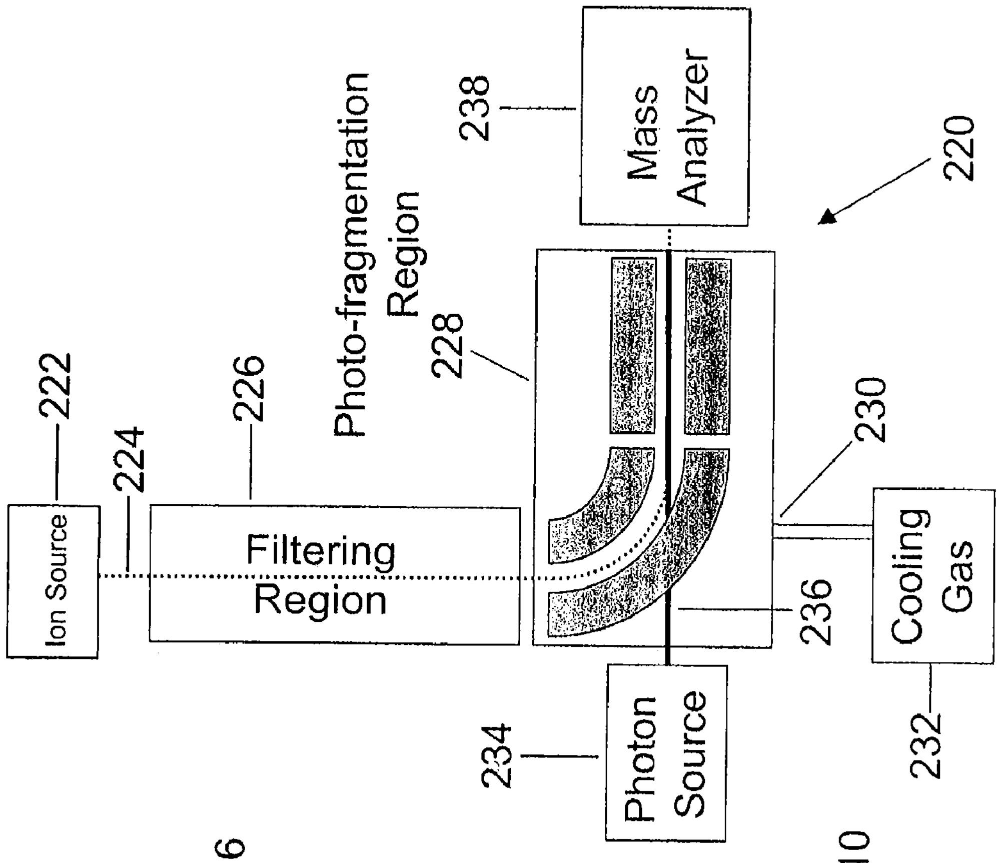
FIGS. 8*a* and 8*b* schematically illustrate a photo-fragmentation system in which the ion beam is bent allowing for co-alignment of the ion beam with the light beam, in accordance with various embodiments.
Figure 8A:
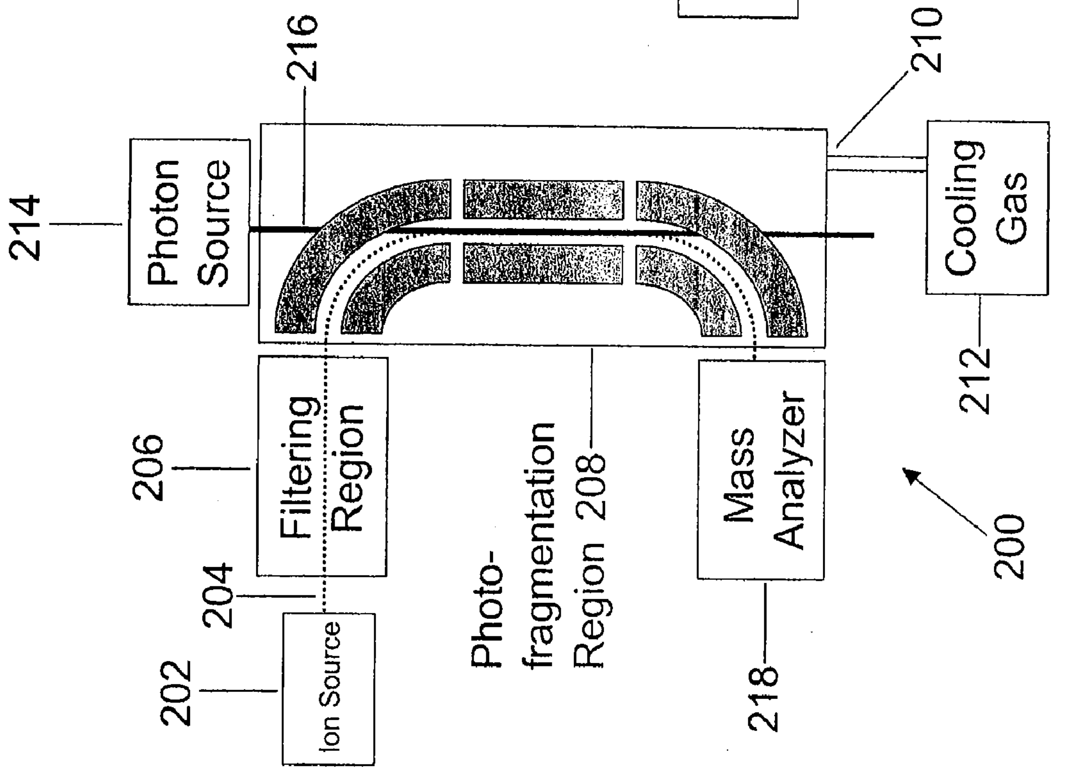

Referring to FIG. 8*a*, in various embodiments in accordance with the applicant's teachings, a schematic diagram illustrates a photo-fragmentation system 200 having an ion source 202 configured to generate a beam of ions 204 from a sample into a filtering region 206 for selecting desired ions. A photo-fragmentation region 208 having a higher pressure than the filtering region 206 can be provided to generate fragment ions predominantly by prompt fragmentation. In various embodiments, the pressure in the photo-fragmentation region 208 can be greater than 1 mTorr. In various embodiments, the pressure in the photo-fragmentation region 208 can be from about 10 mTorr to about 100 Torr and preferably from about 10 mTorr to about 10 Torr. An inlet 210 can provide gas 212, referred to as cooling gas, to the photo-fragmentation region 208 to maintain the higher pressure in the photo-fragmentation region 208 than the pressure in the filtering region 206. In various embodiments, the gas 212 can be pulsed. In various aspects, the gas 212 can be controlled by a flow control device. For example, the flow control device can be a pulsed or a proportional valve. The pressure in the region 208 can also be adjusted by opening/closing pumping port, or by other suitable means as known in the art. A photon source 214 can emit a beam of light 216 for photo-fragmenting the selected desired ions in the photo-fragmentation region 208 to generate fragment ions predominantly by prompt fragmentation. In various embodiments, the ion beam 204 can be bent by, for example, an RF ion guide, an electrostatic deflector, or any other suitable means as known in the art, as shown in FIG. 8*a*. In various aspects, bending the ion beam 204 can allow co-alignment of the ion beam 204 with the beam of light 216 as shown in FIG. 8*a*. The photon source 214 can comprise, for example, a laser or an array of lasers, LED or array of LEDs, discharge lamp, a source of light with adjustable properties or any other source as known in the art. The photon source 214 can be capable of causing photo-fragmentation of the selected ions. In various embodiments, the photon source 214 can emit a beam of light 216 at a wavelength from about 190 nm to about 900 nm. The beam of light 216 emitted by the photon source 214 can be reflected multiple times with mirrors to increase the efficiency of photo-fragmentation of the selected ions. In various embodiments, photo-fragmentation can be conducted in a flow-through or a trapping mode. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 218 can mass analyze the fragment ions. The mass analyzer 218 can comprise a more complex instrument that can provide sophisticated ion analysis such as mass analysis, ion mobility separation, additional fragmentation or a combination of the above.

Referring to FIG. 8*b*, in various embodiments in accordance with the applicant's teachings, a schematic diagram illustrates a photo-fragmentation system 220 having an ion source 222 configured to generate a beam of ions 224 from a sample into a filtering region 226 for selecting desired ions. A photo-fragmentation region 228 having a higher pressure than the filtering region 226 can be provided to generate fragment ions predominantly by prompt fragmentation. In various embodiments, the pressure in the photo-fragmentation region 228 can be greater than 1 mTorr. In various embodiments, the pressure in the photo-fragmentation region 228 can be from about 10 mTorr to about 100 Torr and preferably from about 10 mTorr to about 10 Torr. An inlet 230 can provide gas 232, referred to as cooling gas, to the photo-fragmentation region 228 to maintain the higher pressure in the photo-fragmentation region 228 than the pressure in the filtering region 226. In various embodiments, the gas 232 can be pulsed. In various aspects, the gas 232 can be controlled by a flow control device. For example, the flow control device can be a pulsed or a proportional valve. The pressure in the region 228 can also be adjusted by opening/closing pumping port, or other suitable means as known in the art. A photon source 234 can emit a beam of light 236 for photo-fragmenting the selected desired ions in the photo-fragmentation region 228 to generate fragment ions predominantly by prompt fragmentation. In various embodiments, the ion beam 224 can be bent by, for example, an RF ion guide, an electrostatic deflector, or any other suitable means as known in the art, as shown in FIG. 8*b*. In various aspects, bending the ion beam 224 can allow co-alignment of the ion beam 224 with the beam of light 236 as shown in FIG. 8*b*. The photon source 234 can comprise, for example, a laser or an array of lasers, LED or array of LEDs, discharge lamp, a source of light with adjustable properties or any other source as known in the art. The photon source 234 can be capable of causing photo-fragmentation of the selected ions. In various embodiments, the photon source 234 can emit a beam of light 236 at a wavelength from about 190 nm to about 900 nm. The beam of light 236 emitted by the photon source 234 can be reflected multiple times with mirrors to increase the efficiency of photo-fragmentation of the selected ions. In various embodiments, photo-fragmentation can be conducted in a flow-through or a trapping mode. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 238 can mass analyze the fragment ions. The mass analyzer 218 can comprise a more complex instrument that can provide sophisticated ion analysis such as mass analysis, ion mobility separation, additional fragmentation or a combination of the above.

Figure 9:
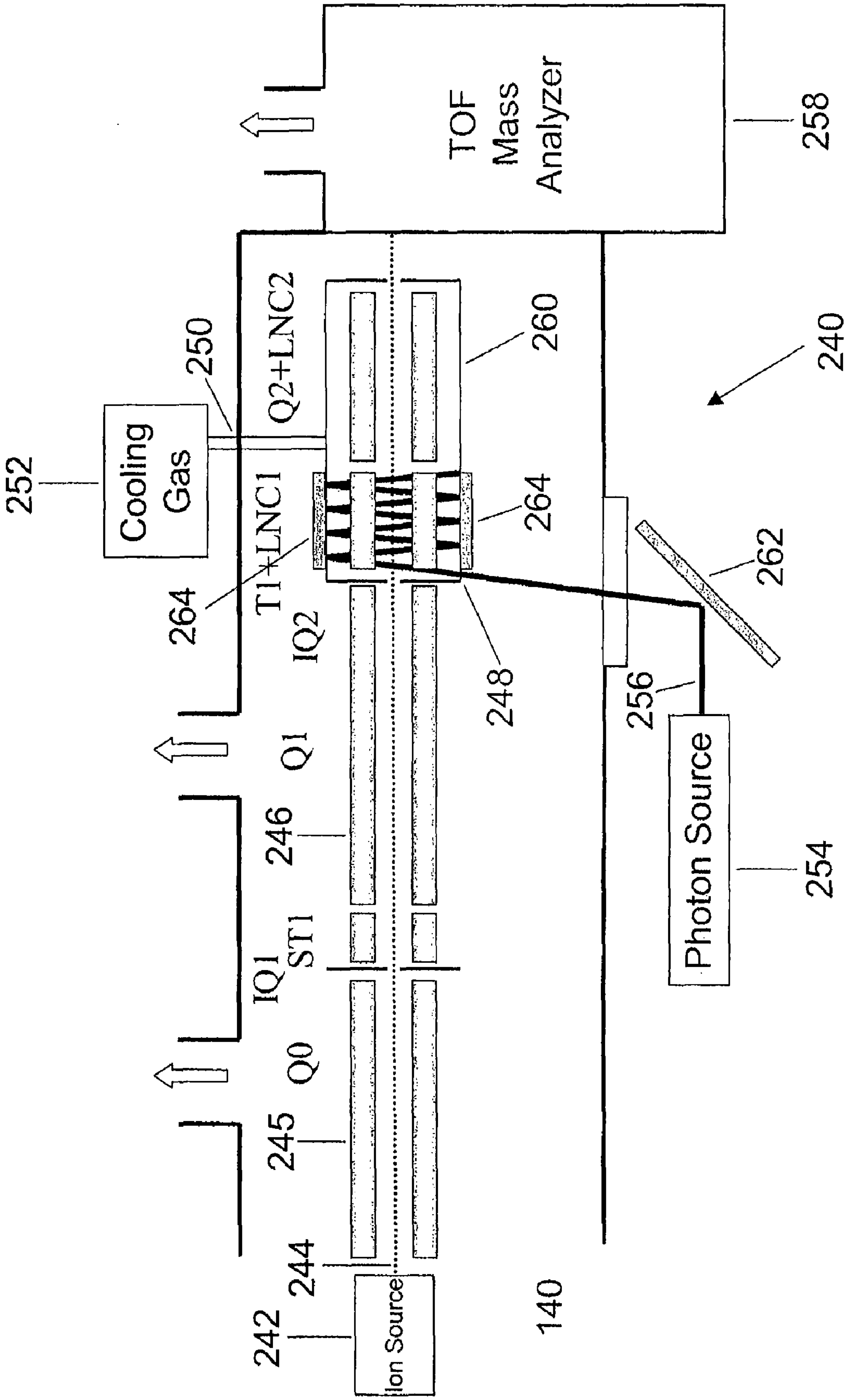
FIG. 9 schematically illustrates a photo-fragmentation system, including a Quadrupole Time-of-Flight mass spectrometer with an ion trapping region, in accordance with various embodiments.

As shown in FIG. 9, in various embodiments in accordance with the applicant's teachings, a schematic diagram illustrates a photo-fragmentation system 240 having an ion source 242 configured to generate a beam of ions 244 and focus the beam of ions 244 from a sample using a collisional focusing RF-ion guide (Q0) 245 into a filtering region 246 for selecting desired ions. A photo-fragmentation region 248 having a higher pressure than the filtering region 246 can be provided to generate fragment ions predominantly by prompt fragmentation. A trapping region 260 can be provided in the photo-fragmentation region 248. The selected desired ions from the filtering region 246 can be trapped in the trapping region 260. The trapping region 260 can comprise Linac electrodes, an RF ion guide, or other suitable means as known in the art for confining the ions. In various embodiments, the pressure in the photo-fragmentation region 248 can be greater than 1 mTorr. In various embodiments, the pressure in the photo-fragmentation region 248 can be from about 10 mTorr to about 100 Torr and preferably from about 10 mTorr to about 10 Torr. An inlet 250 can provide gas 252, referred to as cooling gas, to the photo-fragmentation region 248 to maintain the higher pressure in the photo-fragmentation region 248 than the pressure in the filtering region 246. In various embodiments, the gas 252 can be pulsed. In various aspects, the gas 252 can be controlled by a flow control device. For example, the flow control device can be a pulsed or a proportional valve. The pressure in the region 248 can also be adjusted by opening/closing pumping port, or by other suitable means as known in the art. A photon source 254 can emit a beam of light 256 for photo-fragmenting the selected desired ions in the photo-fragmentation region 248 to generate fragment ions predominantly by prompt fragmentation. The photon source 254 can comprise, for example, a laser or an array of lasers, LED or array of LEDs, discharge lamp, a source of light with adjustable properties or any other source as known in the art. The photon source 254 can be capable of causing photo-fragmentation of the selected ions. In various embodiments, the photon source 254 can emit a beam of light 256 at a wavelength from about 190 nm to about 900 nm. The beam of light 256 emitted by the photon source can be reflected with a mirror 262 and directed to the photo-fragmentation region 248. The beam of light 256 can be reflected multiple times with mirrors 264 to increase the efficiency of photo-fragmentation of the selected ions as shown in FIG. 9. In various embodiments, the beam of light 256 emitted by the photon source 254 and the beam of ions 244 generated by the ion source 242 can intersect each other as shown in FIG. 9. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer 258 can mass analyze the fragment ions. The mass analyzer 258 can be a Time-of-Flight mass analyzer, as shown in FIG. 9.

Examples

Aspects of the applicant's teachings can be further understood in light of the following examples, which should not be construed as limiting the scope of the applicant's teachings in any way.

Instrumentation

An ultraviolet photodissociation (UVPD) setup was incorporated into a Quadrupole Time-of-Flight (QqTOF) mass spectrometer equipped with an Electrospray Ionization (ESI) source as shown in FIG. 9. The front section of the collision cell of the QqTOF was converted into a linear ion trap with a laser beam entering the ion trap perpendicular to the ion path axis.

Two UV lasers were tested: MicroChip SNU-004 (266 nm, 4 mW) from TEEM Photonics and StableLight (355 nm, 100 mW) from JDS Uniphase. Dielectric mirrors with better than 99% reflectivity at both 266 nm and 355 nm were added to the instrument in an arrangement analogous to a White cell to improve laser beam utilization. The pressure of the buffer gas during UVPD was varied with a pulsed valve.

Timing of UVPD Experiments

Figure 10:
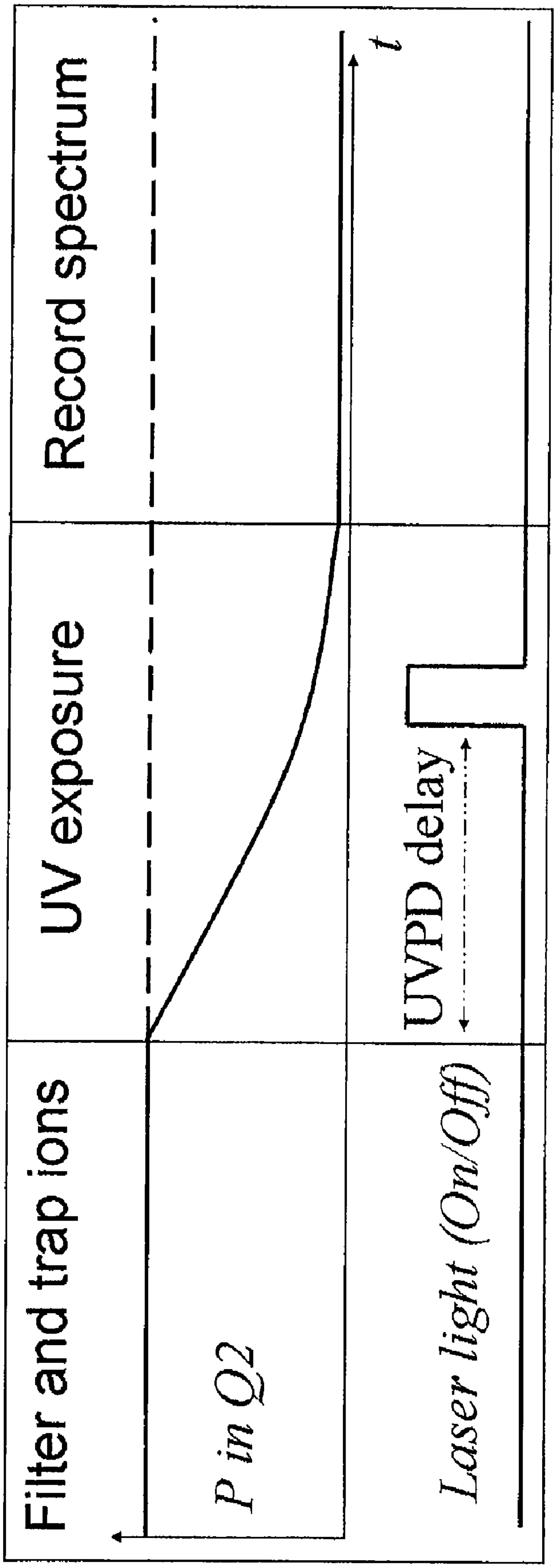
FIG. 10 illustrates a timing diagram of ultraviolet photodissociation experiments, in accordance with various embodiments.

A timing diagram of UVPD experiments is shown in FIG. 10. Ions of interest were filtered in Q1 and subsequently trapped in the T1 section. In some experiments, the pressure of the buffer gas in the T1/Q2 region was kept constant. In experiments studying the effect of the pressure on UVPD, the pulsed valve was turned off after the trapping segment resulting in a gradual decline of the pressure.

Efficiency Gain for Multi-Pass Optical Arrangement

The initial setup for exploring UVPD on a QqTOF had the laser light intersecting with the ion cloud only once. In this arrangement, the length of the ion cloud was approximately 20 mm along the axis while the region covered by laser light was about 1 mm long. As a result, typical fragmentation times ranged from hundreds of milliseconds to a few seconds.

Figure 11:
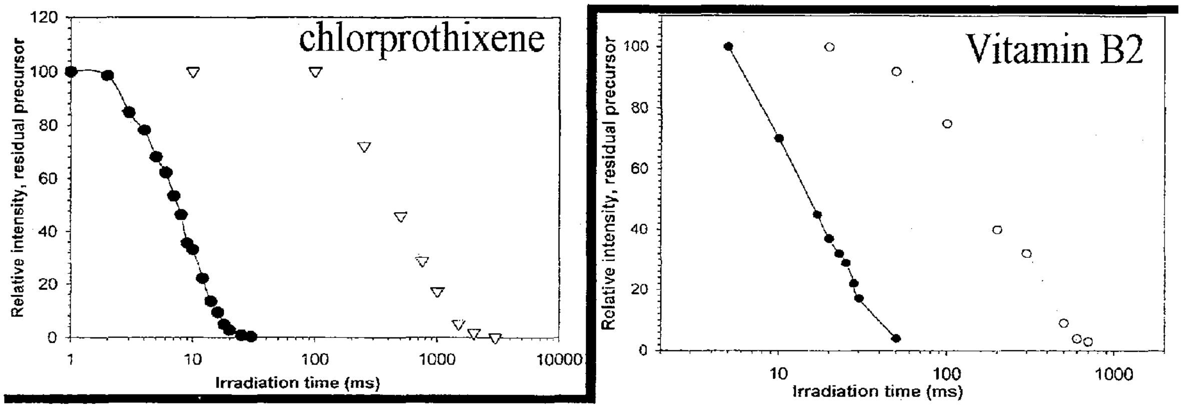
FIG. 11 illustrates improvement in fragmentation rate with a multi-pass arrangement, in accordance with various embodiments.

A multi-pass optical arrangement, as shown in FIG. 9, utilizing dielectric mirrors was built to improve laser light utilization. The gain in the fragmentation rate was expected to be almost proportional to the number of reflections. An improvement in the fragmentation rate is shown in FIG. 11 for two compounds.

Experimental Conditions Influencing UVPD Pathways

Two experimental parameters can affect the fragmentation spectra in UVPD. The first parameter that can affect the UVPD spectra is that the wavelength of light is directly related to the energy imparted into an ion by the photon absorption. The wavelength can also dictate which part of the ion can act as a chromophore, i.e., where the photon energy can be released.

Figure 12:
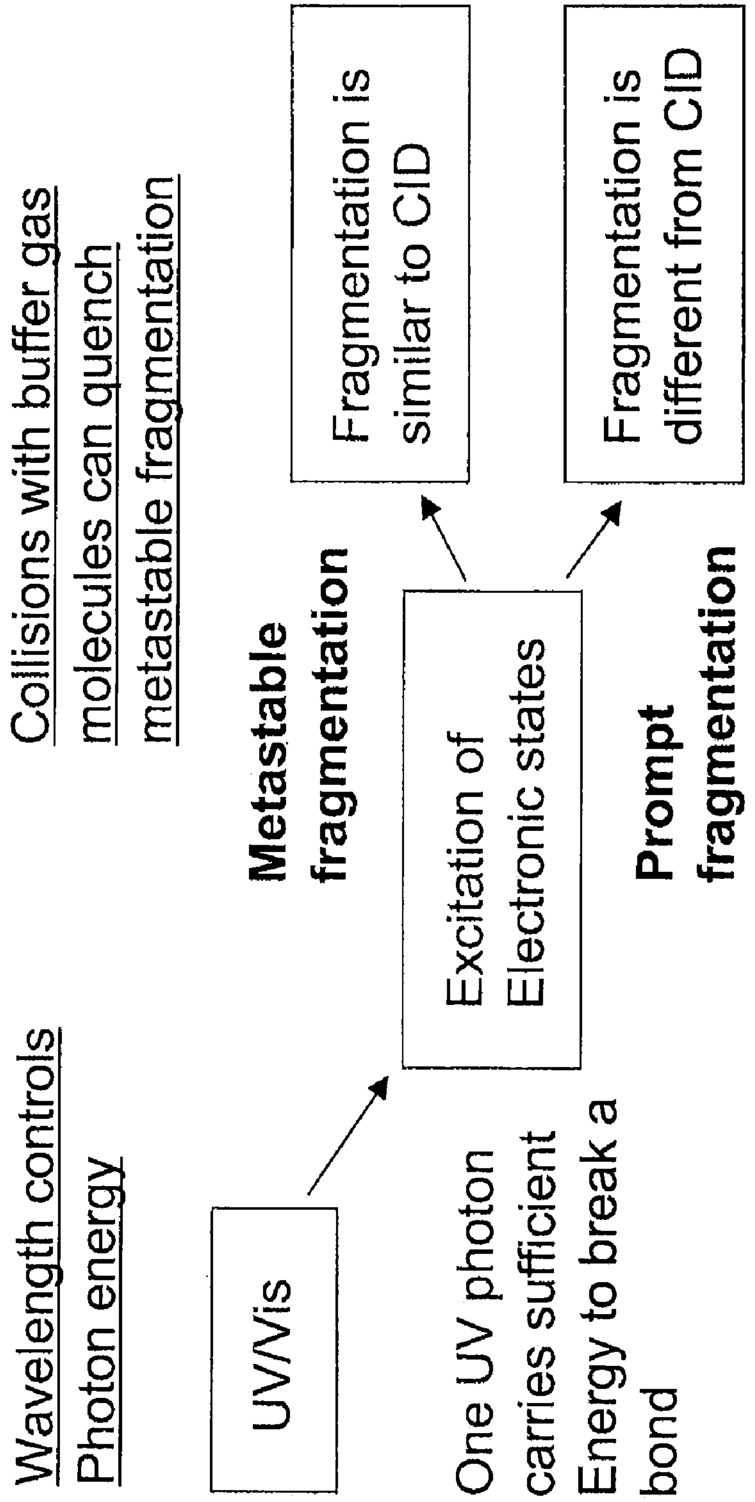
FIG. 12 illustrates the influence of wavelength and buffer gas pressure on ultraviolet photodissociation, in accordance with various embodiments.

The second parameter that can affect UVPD spectra is the pressure of the buffer gas. At a first glance, it may seem unlikely that the pressure of the buffer gas can have a significant effect. After all, the photon absorption is substantially faster than the typical rate of collisions. However, when the energy of the photon is channeled into creation of a metastable ion, this type of excitation can be quenched by collisions with a colder buffer gas. The interplay of experimental parameters and their influence on UVPD pathways is shown in FIG. 12.

Experimental Comparison of CID and UVPD Spectra

Figure 13:
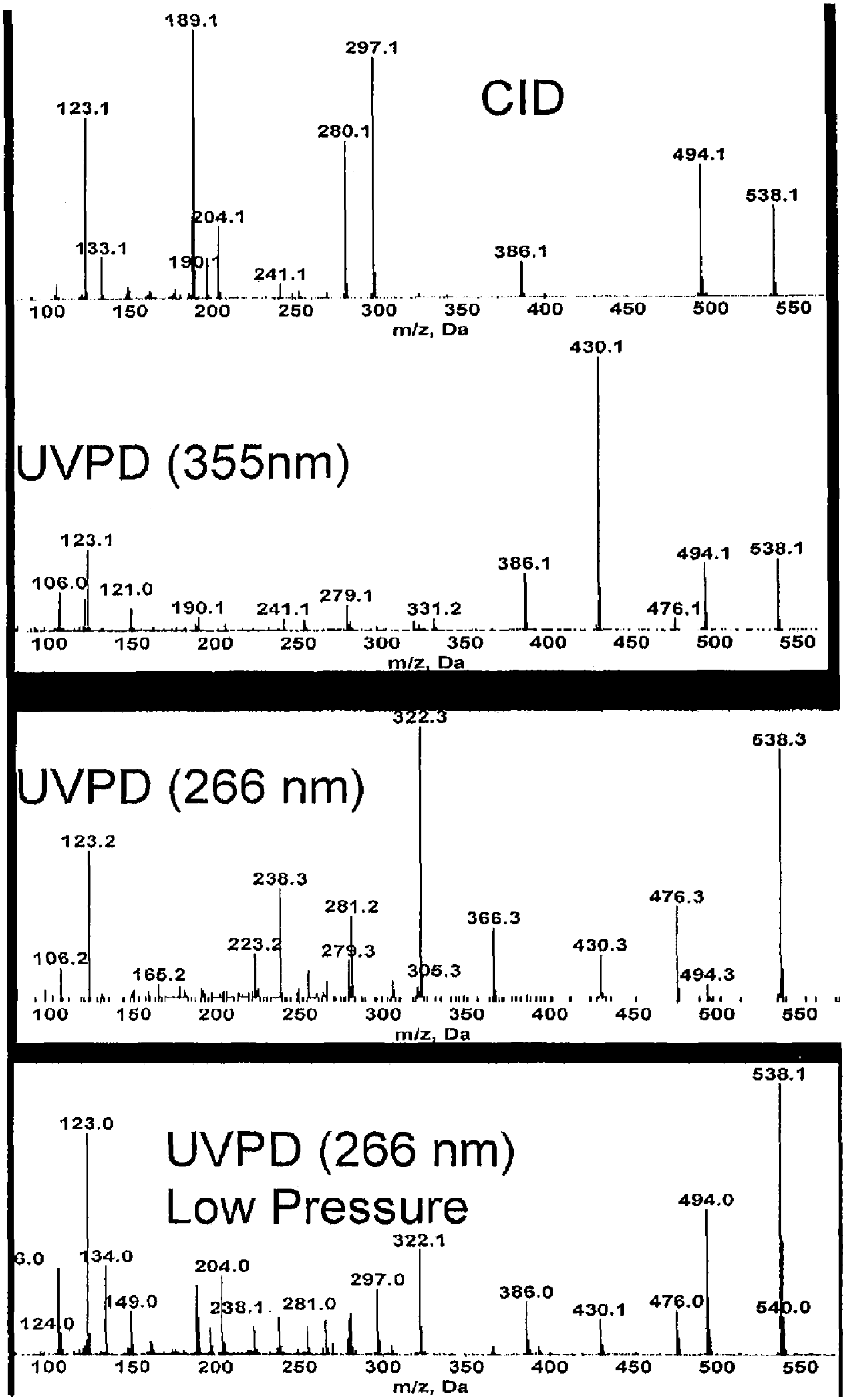
FIG. 13 illustrates the fragmentation spectra of desmethyl bosentan, in accordance with various embodiments.

FIG. 13 shows the fragmentation spectra of desmethyl bosentan acquired under different experimental conditions. The wavelength of light and the pressure of the buffer gas can significantly influence fragmentation patterns in UVPD.

Figure 14:
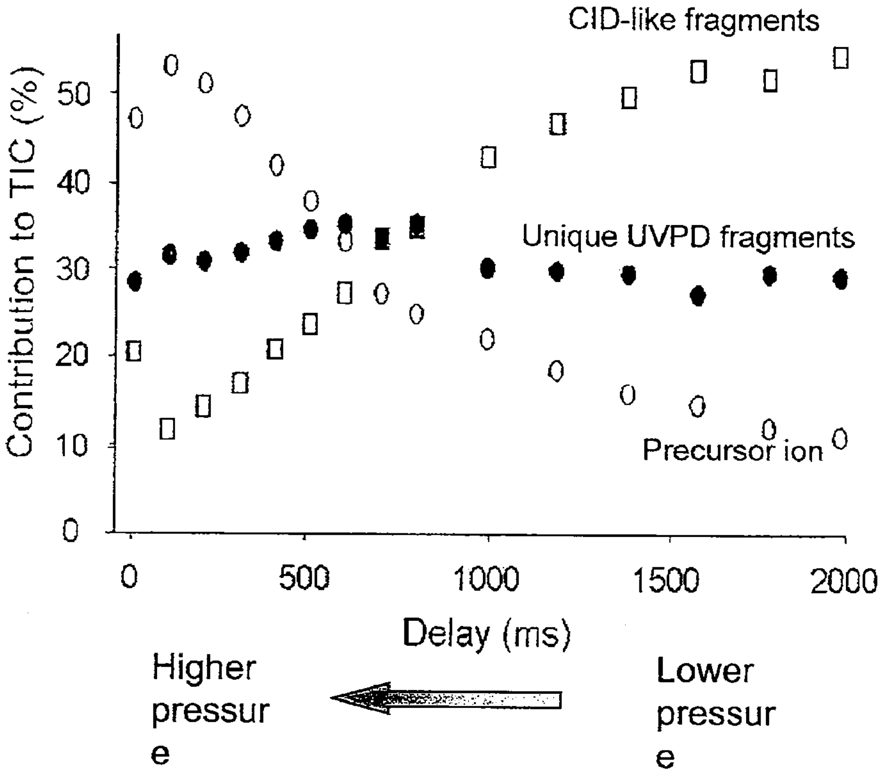
FIG. 14 illustrates the fragmentation yield and the ratio of intensities of unique ultraviolet photodissociation-type ions versus CID-type ions for desmethyl bosentan as a function of UVPD delay (buffer gas pressure), in accordance with various embodiments.

The influence of the pressure of the buffer gas on the fragmentation rate and the abundance of unique UVPD fragments is shown in FIG. 14. UVPD can often generate fragmentation patterns substantially different from those generated by CID. Both the wavelength of light and the pressure of the buffer gas determine fragmentation patterns in UVPD. The higher pressure of the buffer gas can emphasize unique UVPD ions. Although, the overall fragmentation rate is slightly lower at higher pressure.

The following describes a general use of the applicant's teachings which is not limited to any particular embodiment, but can be applied to any embodiment. In operation, an ion source can be configured to generate a beam of ions from a sample into a filtering region. Desired ions can be selected in the filtering region and passed into a photo-fragmentation region having a higher pressure than the filtering region to generate fragment ions predominantly by prompt fragmentation. A photo-fragmentation region having a higher pressure than the filtering region can quench metastable fragmentation that is readily observed with low energy CID, the most widely used method of ion fragmentation. Photo-fragmenting the selected desired ions in a region having a higher pressure than that of the filtering region can lead to predominantly prompt fragmentation. The fragments produced by the prompt fragmentation can be unique, distinct ion fragments that can provide information about ion structure substantially different than those produced by CID. An inlet can provide gas to the photo-fragmentation region to maintain the higher pressure in the photo-fragmentation region than the pressure in the filtering region. In various embodiments, the pressure in the photo-fragmentation region can be greater than 1 mTorr. In various embodiments, the pressure in the photo-fragmentation region can be from about 10 mTorr to about 100 Torr and preferably from about 10 mTorr to about 10 Torr. In various embodiments, the gas can be pulsed. In various aspects, the gas can be controlled by a flow control device. For example, the flow control device can be a pulsed or a proportional valve. The pressure in photo-fragmentation region can also be adjusted by open/close pumping, or other suitable means as known in the art.

A trapping region can be provided in the photo-fragmentation region. The selected desired ions from the filtering region can be trapped in the trapping region prior to photo-fragmentation. The trapping region can comprise an RF ion guide or other means as known in the art for confining the ions. In various embodiments, photo-fragmentation can be conducted in a flow-through or a trapping mode. A photon source can emit a beam of light for photo-fragmenting the selected desired ions in the photo-fragmentation region to generate fragment ions predominantly by prompt fragmentation. The photon source can comprise, for example, a laser or an array of lasers, LED or array of LEDs, discharge lamp, a source of light with adjustable properties or any other source as known in the art. The photon source can be capable of causing photo-fragmentation of the selected ions. In various embodiments, the photon source can emit a beam of light at a wavelength from about 190 nm to about 900 nm. In various aspects, the beam of light can be reflected with a mirror and directed into the photo-fragmentation region. In various embodiments, the beam of light emitted by the photon source can be reflected multiple times with mirrors to increase the efficiency of photo-fragmentation of the selected ions. In various embodiments, the beam of light emitted by the photon source and the beam of ions generated by the ion source can intersect each other or be co-aligned with each other. In various aspects, the fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various embodiments, a mass analyzer can mass analyze the fragment ions. The mass analyzer can comprise a more complex instrument that can provide sophisticated ion analysis such as mass analysis, ion mobility separation, additional fragmentation or a combination of the above.

In various embodiments, the fragment ions can be filtered in the filtering region to select desired fragment ions. The desired fragment ions can then be photo-fragmented in the photo-fragmentation region having a higher pressure than the filtering region to generate secondary fragment ions predominantly by prompt fragmentation. The secondary fragment ions can be further fragmented by a fragmentation method as known in the art. For example, the fragment ions can be further fragmented by collision induced dissociation, surface induced dissociation, fragmentation by metastable atom bombardment, electron capture dissociation, electron transfer dissociation, or photo-fragmentation. In various aspects, the mass analyzer can mass analyze the secondary fragment ions. In various embodiments, the filtering, photo-fragmenting, including the trapping, and mass analyzing of the ions can occur in the same region.

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those skilled in the art.

In various embodiments, the photon source can be, but is not limited to, a laser, an array of lasers, LED, an array of LEDs, a discharge lamp, or a source of light with adjustable properties.

In various embodiments, the gas typically can be a non-reactive gas, and can be, but is not limited to, nitrogen, argon, or helium.

In various embodiments, an ion guide can be, but is not limited to, a multipole. For example, an ion guide can be a quadrupole, a hexapole, or an octapole. An ion guide can be an RF ring guide or any RF guide in which RF fields are used to confine or focus ions radially to prevent radial escape of the ions. An ion guide can be, but is not limited to, a 2D trap, also known as a linear ion trap, or a collision cell.

In various embodiments, the mass analyzer can be, but is not limited to, a quadrupole mass spectrometer, a time-of-flight mass spectrometer, an ion mobility mass spectrometer, a fourier transform mass spectrometer, a linear ion trap, 3-D ion trap, or an orbitrap mass spectrometer.

All such modifications or variations are believed to be within the sphere and scope of the applicant's teachings as defined by the claims appended hereto.

The invention claimed is:

1. A method of photo-fragmentation, comprising:

a) generating a beam of ions from a sample with an ion source;

b) filtering the beam of ions in a filtering region to select desired ions; and c) photo-fragmenting the desired ions in a photo-fragmentation region having a higher pressure than the filtering region to generate fragment ions predominantly by prompt fragmentation, wherein the pressure in the photo-fragmentation region is greater than 1 mTorr.

2. The method of claim 1 further comprising after step b) trapping the selected ions in the photo-fragmentation region.

3. The method of claim 1 or 2 further comprising after step c) filtering the fragment ions in the filtering region to select desired fragment ions.

4. The method of claim 3 wherein the selected desired fragment ions are photo-fragmented in the photo-fragmentation region, the photo-fragmentation occurring at a higher pressure than the filtering region to generate secondary fragment ions predominantly by prompt fragmentation.

5. The method of claim 1 or 4 wherein the fragment and secondary fragment ions are further fragmented by a fragmentation method selected from the group consisting of collision induced dissociation, surface induced dissociation, fragmentation by metastable atom bombardment, electron capture dissociation, electron transfer dissociation, and photo-fragmentation.

6. The method of claim 1, 4, or 5 further comprising mass analyzing the fragment and secondary fragment ions.

7. The method of claim 6 wherein the filtering, photo-fragmenting, trapping, and mass analyzing of the ions, fragment ions, and secondary fragment ions occur in the same region.

8. The method of claim 2 wherein the trapping comprises providing an RF ion guide for confining the ions.

9. The method of claim 1 wherein in step c) a gas is provided for maintaining the higher pressure in the photo-fragmentation region than the filtering region.

10. The method of claim 9 wherein the gas is pulsed.

11. The method of claim 1 wherein the pressure in the photo-fragmentation region is from about 10 mTorr to about 100 Torr.

12. The method of claim 1 wherein the selected ions are photo-fragmented by a photon source emitting a beam of light.

13. The method of claim 12 wherein the photon source is selected from the group comprising a laser, LED, discharge lamp, and a source of light with adjustable properties.

14. The method of claim 12 wherein the wavelength of the photon source is capable of causing photo-fragmentation of the selected ions.

15. The method of claim 12 wherein the photon source emits a beam of light at a wavelength from about 190 nm to about 900 nm.

16. The method of claim 12 wherein the beam of light emitted from the photon source is reflected multiple times with mirrors to increase the efficiency of the photo-fragmentation of the selected ions.

17. The method of claim 12 wherein the beam of light emitted by the photon source and the beam of ions generated by the ion source are co-aligned with each other.

18. The method of claim 12 wherein the beam of light emitted by the photon source and the beam of ions generated by the ion source intersect each other.

19. An apparatus for photo-fragmentation, comprising:

a) an ion source configured to generate a beam of ions from a sample;

b) a filtering region for selecting desired ions;

c) a photo-fragmentation region having a higher pressure than the filtering region to generate predominantly prompt fragmentation of the selected desired ions, wherein the pressure in the photo-fragmentation region is greater than 1 mTorr;

d) an inlet for providing gas to the photo-fragmentation region to maintain a pressure in the photo-fragmentation region that is higher than the pressure in the filtering region; and e) a photon source emitting a beam of light for photo-fragmenting the selected ions in the photo-fragmentation region.

20. The apparatus of claim 19 further comprising a trapping region in the photo-fragmentation region for trapping the selected desired ions.

21. The apparatus of claim 19 or 20 further comprising a mass analyzer for mass analyzing the fragment ions.

22. The apparatus of claim 21 wherein the filtering region, photo-fragmentation region, trapping region, and mass analyzer are located in the same region.

23. The apparatus of claim 20 wherein the trapping region comprises an RF ion guide for confining the ions.

24. The apparatus of claim 19 wherein the pressure in the photo-fragmentation region is from about 10 mTorr to about 100 Torr.

25. The apparatus of claim 19 wherein the gas is controlled by a flow control device.

26. The apparatus of claim 19 wherein the gas is pulsed.

27. The apparatus of claim 19 wherein the photon source is selected from the group comprising a laser, LED, discharge lamp, and a source of light with adjustable properties.

28. The apparatus of claim 19 wherein the photon source is capable of causing photo-fragmentation of the selected ions.

29. The apparatus of claim 19 wherein the photon source emits a beam of light at a wavelength from about 190 nm to about 900 nm.

30. The apparatus of claim 19 further comprising mirrors to reflect the beam of light emitted from the photon source multiple times to increase the efficiency of photo-fragmentation of the selected ions.

31. The apparatus of claim 19 wherein the beam of light emitted by the photon source and the beam of ions generated by the ion source are co-aligned with each other.

32. The apparatus of claim 19 wherein the beam of light emitted by the photon source and the beam of ions generated by the ion source intersect each other.

* * * * *